United States Patent [19]

Famili et al.

[11] Patent Number: 5,350,801

[45] Date of Patent: Sep. 27, 1994

[54] SOLID STATE PROCESS FOR MODIFICATION OF POLYVINYL ALCOHOL USING MICHAEL-TYPE ADDITION

[75] Inventors: Amir Famili, Orefield; Lori A. Vratsanos, Breinigsville; Finn L. Marten, Emmaus, all of Pa.

[73] Assignee: Air Products and Chemicals, Inc., Allentown, Pa.

[21] Appl. No.: 89,067

[22] Filed: Jul. 7, 1993

[51] Int. Cl.$^5$ .......................... C08L 29/04; C08F 8/00
[52] U.S. Cl. ........................................ 525/59; 525/60; 525/62; 525/291; 525/296; 525/301; 525/238; 525/221; 524/803
[58] Field of Search .............. 525/59, 60, 62, 291, 525/296, 301, 238, 221; 524/803

[56] References Cited

U.S. PATENT DOCUMENTS

| | | | |
|---|---|---|---|
| 3,125,556 | 3/1964 | Lukman et al. | 260/91.3 |
| 4,320,040 | 3/1982 | Fujita et al. | 525/59 |
| 4,529,522 | 7/1985 | Schmitt | 252/8.5 A |
| 4,545,911 | 10/1985 | Schmitt | 252/8.5 A |
| 4,775,715 | 10/1988 | Beresniewicz et al. | 525/61 |
| 4,822,851 | 4/1989 | Stober et al. | 525/61 |
| 5,001,191 | 3/1991 | Stober et al. | 525/61 |

FOREIGN PATENT DOCUMENTS

| | | |
|---|---|---|
| 128345 | 5/1984 | European Pat. Off. |
| 6056196 | 10/1979 | Japan . |
| 56-73199 | 6/1981 | Japan . |
| 134245 | 3/1982 | Japan . |
| 0226026 | 12/1984 | Japan ............................. 525/59 |
| 63-270704 | 11/1988 | Japan . |
| 1654301 | 6/1991 | U.S.S.R. . |
| 2199834 | 7/1988 | United Kingdom . |

OTHER PUBLICATIONS

Imai, "Synthesis of Sulfone–Modified Polylvinyl Alcohol) and Its Application for Permselective Membrane of Sulfur Dioxide"; *J. of App. Poly. Sci.;* vol. 35; 1817–1828, 1988.

*Polyvinyl Alcohol;* ed. Finch (Wiley 1973) pp. 183–202.

Imai; "Michael Addition Reaction of Vinyl Sulfoxide with Poly(Vinyl Alcohol)", J. Macromol. Sci.–Chem.; vol. A22; H10; pp. 1359–1369; 1985.

*Primary Examiner*—James J. Seidleck
*Assistant Examiner*—W. Robinson H. Clark
*Attorney, Agent, or Firm*—Mary E. Bongiorno; James C. Simmons; William F. Marsh

[57] ABSTRACT

A solid state process for modifying polyvinyl alcohol using a Michael-type addition wherein dry polyvinyl alcohol powder is sprayed with a solution of a monomer capable of Michael-type addition in an amount sufficient to swell the polyvinyl alcohol or maintain its swollen state, but not dissolve or form a slurry of the polyvinyl alcohol. The swollen polyvinyl alcohol is sprayed with a catalyst and the temperature is raised to initiate the reaction between the polyvinyl alcohol and the monomer.

16 Claims, No Drawings

SOLID STATE PROCESS FOR MODIFICATION OF POLYVINYL ALCOHOL USING MICHAEL-TYPE ADDITION

FIELD OF THE INVENTION

The present invention relates to preparation of polyvinyl alcohol derivatives using a Michael-type addition.

BACKGROUND OF THE INVENTION

Polyvinyl alcohol is the largest volume, synthetic, water-soluble and biodegradable resin produced in the world. Its success is due in part to its excellent chemical resistance and physical properties as well as to its very low toxicity. The main applications for polyvinyl alcohol are in textile sizing, adhesives, polymerization stabilizers and paper coatings. As demand increases for better performance in these and other areas, more attention is given to production of polyvinyl alcohol derivatives which can meet the demand. Modification of polyvinyl alcohol by introducing functional groups (for example, sulfonates, phosphates and carboxylates) through copolymerization or post-modification is one means of enhancing the physical properties of polyvinyl alcohol.

Copolymerization of vinyl acetate with functional vinyl monomers followed by saponification is a well-known route to modification of polyvinyl alcohol. Some applications of this technology are exemplified in the following patents:

JP 56-73199 teaches copolymerization of vinyl acetate with 2-acrylamido-2-methylpropanesulfonic acid or its metal salts, to produce a polymer with improved flow properties for application in paper coatings.

U.S. Pat. No. 4,529,522 teaches production of copolymers of polyvinyl alcohol and ethylene oxide or propylene oxide sulfonate ethers for use as viscosifiers i n saline solutions.

JP 60-56196 teaches copolymerization of vinyl acetate with 0.1 to 0.3 mole percent sodium vinyl sulfonate or sodium allyl sulfonate and hydrolysis of 30 to 60 percent of the resulting copolymer. The product can be used in hot melt adhesives.

JP 63-270704 teaches the manufacture of high polymerization degree sulfonic acid-containing modified polyvinyl alcohol by copolymerizing N-sulfoalkyl(-meth)acrylamide and vinyl ester and then saponifying the resulting copolymer. The products are useful as emulsifiers.

The secondary hydroxyl groups in polyvinyl alcohol can be used as an active site for modification. Examples of these reactions can be found in *Polyvinyl Alcohol*, edited by Finch (Wiley, 1973), pages 183–202. Most of the reactions are carried out in aqueous or organic solution and do not result in a solid product. The energy costs associated with preparing the initial solution and in reducing the product to a solid makes most of these modification processes prohibitively expensive. Following are examples of patents on solution modification procedures.

EP-128,345 teaches the reaction of polyvinyl alcohol with alkenal3-sulfonic acid in aqueous solution to form a product used in textile sizing or emulsifiers.

U.S. Pat. No. 4,545,911 teaches grafting pyrrolidium methane sulfonate salt onto the alcohol oxygens of polyvinyl alcohols to form viscosifiers which are useful in waterflooding and in drilling fluids.

Michael-type addition for the reaction of compounds containing activated carbon-carbon double bonds with polyvinyl alcohol is known. U.S. Pat. No. 3,505,303 teaches the reaction of polyvinyl alcohol with acrylamide in a combination slurry/solution process resulting in modification at the hydroxy group of the polyvinyl alcohol and the beta-position of acrylamide.

GB 2,199,834 teaches modification of polyvinyl alcohol with acrylamide and other alpha, beta-unsaturated carbonyl compounds in a water slurry.

Articles by Imia, et al. (*J. Mocromol. Sci.-Chem.*, Vol .A22, No.10, pages 1359–1369, 1985 and *J. Appl. Polym. Sci.*, Vol.35, pages 1817–1828, 1985) describe Michael-type addition of sulfones and sulfoxides to polyvinyl alcohol. The reaction takes place in an aqueous solution.

A few post-modification processes for slurry or solid state reactions are also known. U.S. Pat. No. 3,125,556 teaches the alkoxylation of polyvinyl alcohol in which an organic polar swelling agent may be added to the polyvinyl alcohol prior to alkoxylation.

U.S. Pat. No. 4,775,715 teaches preparation of cationic polyvinyl alcohol by blending polyvinyl alcohol under high shear conditions, at 0° to 100° C. with a small amount of water, a small excess of base, and a quaternizing agent. JP 1-34245 teaches a method for preparing a polyvinyl alcohol type resin containing an acetoacetic ester by mixing a finely divided polyvinyl alcohol powder with diketene in a high intensity mixer.

U.S. Pat. No. 4,822,851 and U.S. Pat. No. 5,001,191 teach a dry blending process for the preparation of cationized polyvinyl alcohol in which polyvinyl alcohol, preferably in powder form, reacts with alkylidene epoxides in an alkaline medium in the presence of water.

SU 1,654,301 teaches the reaction of dried polyvinyl alcohol with caprolactam in the presence of powder zinc or lead in order to form a grafted copolymer.

SUMMARY OF THE INVENTION

This invention relates to a process for modifying polyvinyl alcohol by a Michael-type addition under solid state conditions. Polyvinyl alcohol powder is sprayed with a solution of a monomer which is capable of Michael-type addition and the polyvinyl alcohol is allowed to swell. Alternately, instead of a dry polyvinyl alcohol powder, swollen polyvinyl alcohol particles are used; the particles are produced in the saponification of polyvinyl acetate with a primary alcohol using an alkali catalyst. The swollen particles are sprayed with a solution of a monomer which is capable of Michael-type addition. A catalyst is also sprayed onto the swollen polyvinyl alcohol and the temperature is raised to initiate the reaction between the polyvinyl alcohol and the monomer. The modified polyvinyl alcohol product may be recovered as a solid and used as is or dried to remove residual solvent.

The major advantages to this invention are:

it provides a versatile process for producing a variety of specialized polyvinyl alcohol copolymers using a single process unit;

it produces a product which is recoverable as a solid without further processing;

it provides a low cost method for producing functionalized polyvinyl alcohol; and it provides a relatively simple process for modification of polyvinyl alcohol at the hydroxy oxygen on the polyvinyl alcohol chain.

DETAILED DESCRIPTION OF THE INVENTION

Polyvinyl alcohol is modified using a Michael-type addition. Michael addition is the nucleophilic addition of an α, β-unsaturated carbonyl compound to a carbanion. In the present invention, the monomer, an olefinic compound containing electron withdrawing groups is added to polyvinyl alcohol at the hydroxy group. A solution of an appropriate monomer is sprayed onto dry polyvinyl alcohol powder under agitation. It is preferable to add the monomer in the beginning with the solvent in order to keep the amount of solvent used in the process to a minimum, however a solvent can be added separately to swell the polyvinyl alcohol powder followed by addition of the reactive monomer in solution. A sufficient amount of swelling is determined visually through volume increase of powder, typically about 20 minutes is allowed. However, by the time all of the monomer solution is added, the polymer is usually fully swollen. The swollen polyvinyl alcohol powder facilitates the transport of the monomer throughout the polyvinyl alcohol particles. A basic catalyst is sprayed onto the swollen powder and the temperature is raised to start the reaction between the monomer and the polyvinyl alcohol. Alternately, the temperature can be raised before the basic catalyst is sprayed onto the swollen powder. It is known to one skilled in the art that addition of a basic catalyst can affect the degree of hydrolysis of the polyvinyl alcohol, since a base catalyst is used in the saponification of polyvinyl acetate to polyvinyl alcohol.

The reaction is carried out in any apparatus capable of giving good agitation of solids, including blenders, high intensity mixers, ribbon blenders, sigma blade mixers and the like. Misters or spraying equipment, commonly known in the art, can be used to spray the monomer solution onto the polyvinyl alcohol powder and the catalyst onto the swollen polyvinyl alcohol powder.

Polyvinyl alcohol is used as a dry powder, preferably a powder having a particle size of less than about 5 min. The degree of polymerization (DPn) of the polyvinyl alcohol depends on the application anticipated for the modified polymer product; it can range from about 200 to 2500. The degree of hydrolysis of polyvinyl alcohol can vary from about 80 mole % to 99.9 mole %, preferably 87 mole % to 98 mole %. Partially hydrolyzed polyvinyl alcohol is preferred because it swells better; especially preferred is 87 mole % to 89 mole % hydrolyzed polyvinyl alcohol. Alternately, the polyvinyl alcohol can be in the form of swollen particles which are produced in the saponification of polyvinyl acetate to polyvinyl alcohol. The saponification process involves an ester exchange between polyvinyl acetate and a primary alcohol in the presence of a base catalyst such as sodium hydroxide or sodium methoxide. A drying process normally follows saponification to remove alcohol and produce a final polyvinyl alcohol product.

Compounds suitable as modifiers include sulfonated vinyl compounds such as sodium vinyl sulfonate and sodium allyl sulfonate, acrylamide and its derivatives including N-methylolacrylamide, N-methylolmethacryl amide, 2-acryl amido-2-methyl propanesulfonic acid, and acrylonitrile.

Water is the best solvent for the monomer for cost and safety reasons, but other solvents which dissolve or swell polyvinyl alcohol and dissolve or disperse the reactant monomer may be used. Examples of suitable solvents include methanol, ethanol, tetrahydrofuran, and dimethylsulfoxide. The amount of solvent used must be enough to swell the polyvinyl alcohol but not enough to cause stickiness, dissolution, or a slurry of the polyvinyl alcohol. One skilled in the art will be able to determine the appropriate amount of solvent based on the degree of polymerization and the degree of hydrolysis of the polyvinyl alcohol. For example, when using water, 25 wt % water based on polyvinyl alcohol with 88 mole 4 hydrolysis and 500 DPn; when using methanol, 35 wt % methanol based on polyvinyl alcohol with 88 mole % hydrolysis and 500 DPn. The addition of a processing aid such as glycerol monooleate (GMO) can facilrate mixing with less sticking of the powder and can allow the addition of larger amounts of modifier.

In order to obtain good yields of modified polyvinyl alcohol, a basic catalyst is used; for example alkali metal hydroxides, alkali metal alkoxides, or triethylamine. Sodium hydroxide or potassium hydroxide is preferred.

The reactants are used at a level ranging from 1% to 100% on a molar ratio with the hydroxyl groups of polyvinyl alcohol, depending on the degree of modification desired; the preferred range is 1% to 5%. The catalyst is used at a molar ratio of 0.001% to 100% of the polyvinyl alcohol; preferably 0.1% to 1%.

The reaction temperature can vary from about 25° C. to about 100° C.; the preferred temperature range is 50° C. to 80° C. Reaction time will vary from about 50 minutes to about 120 minutes and will depend on the temperature. The solvents are driven off during the reaction, leaving a substantially dry product. Modified polyvinyl alcohol may be recovered as a solid and used as is or dried to remove residual solvent, or it may be washed to remove residual salts and monomers.

The following examples are intended to illustrate embodiments of the invention and are not intended to restrict the scope thereof.

EXAMPLE 1

Airvol ® 203 polyvinyl alcohol (88 mole % hydrolysis; 250 DPn) powder (3000 g) along with 20.3 g of glycerol monooleate (GMO) was charged to a Littleford plowshare mixer and mixing was started. The temperature was raised to 35° C. and 1505 g of 50 wt % aqueous solution of sodium 2-acryl ami do-2-methyl propanesulfortate was sprayed onto the polyvinyl alcohol powder. The powder was allowed to swell for 20 minutes. The temperature was then raised to 50° C. and a mixture of 60.2 g of 50 wt % sodium hydroxide with 40 g of water was sprayed onto the swollen powder. The temperature was raised to 65° C. and good agitation continued for 2 hours. The mixture was then neutralized with acetic acid and dried while mixing.

EXAMPLE 2

Airvol ® 203 polyvinyl alcohol powder (500 g) was placed in a Waring blender. Sodium vinyl sulfonate (100 g of a 25% solution) was sprayed gradually onto the polyvinyl alcohol powder with sufficient mixing to give a homogeneous mixture. The powder was allowed to swell for 30 minutes while continuing the mixing. The powder was then sprayed slowly with 20 g of 50% sodium hydroxide and mixing was continued at 50° C. for two hours. The powder was washed in methanol, neutralized with hydrochloric acid, filtered and dried.

EXAMPLE 3

Airvol ®203 polyvinyl alcohol powder (500.5 g) was placed in a Waring blender. Agitation was started and the temperature was allowed to rise to 50° C. Sodium vinyl sulfonate (143.2 g of a 254 aqueous solution) was sprayed onto the mixing powder, followed by 30 minutes of mixing to allow sufficient swelling. Sodium hydroxide (5.10 g of a 50% solution) in 15 g of methanol was then added with mixing. The temperature continued to rise to 60° C. The sample was removed from the mixer and placed into a 70° C. oven for 1 hour. After cooling, the product was washed in methanol and nitric acid was added to neutralize the catalyst. The product was filtered and dried. Atomic analysis for sulfur on an aqueous solution of the product indicated the presence of 2.1 mole % sulfonate groups, representing a 45% conversion.

EXAMPLE 4

Airvol® 203 polyvinyl alcohol powder (500.8 g) was placed into a Waring blender and agitation was started. Sodium vinyl sulfonate (95.44 g of a 25% aqueous solution) was added and the powder was allowed to swell for 20 minutes. Sodium hydroxide (9.8 g of a 504 solution) in 10 g of methanol was then sprayed onto the mixture. The mixture was transferred to an oven and maintained at 53° C. for 45 minutes. After washing, neutralizing, and drying the product as in Example 3, the conversion was measured by atomic adsorption of sulfur. Atomic analysis for sulfur indicated 1.0 mole % sulfonate groups or a 33% conversion.

EXAMPLE 5

Airvol® 321LA polyvinyl alcohol (98 mole % hydrolysis; 350 DPn) powder (300 g) was placed into a Waring blender and agitation was started. 2-Acrylamido-2-methylpropanesulfonate (235 g of a 30 wt % solution) was sprayed onto the mixing powder. Sodium hydroxide (235 g of a 50% solution) was then added and the mixture was placed in a oven and maintained at 60° C. for 3 hours. The product was washed in methanol, filtered, and washed again in acetone. The product was analyzed for sulfur and found to contain 2.3 mole % sulfur groups representing a 46% conversion.

STATEMENT OF INDUSTRIAL USE

Modified polyvinyl alcohol produced by this solid state process may be used in paper coatings, as emulsion stabilizers, or for pigment dispersal.

We claim:

1. A method for modifying polyvinyl alcohol comprising:
    (a) spraying a polyvinyl alcohol powder with an amount of a solvent containing a monomer capable of Michael-type addition such that the solvent swells the polyvinyl alcohol powder but does not form a slurry with the polyvinyl alcohol powder and does not dissolve the polyvinyl alcohol powder;
    (b) allowing the sprayed polyvinyl alcohol powder to swell;
    (c) spraying a base catalyst onto the swollen polyvinyl alcohol powder; and
    (d) raising the temperature of the swollen polyvinyl alcohol powder to initiate a Michael-type reaction between the polyvinyl alcohol and the monomer, wherein the base catalyst serves to catalyze the Michael-type reaction between the polyvinyl alcohol and the monomer.

2. The method of claim 1 wherein the polyvinyl alcohol powder is maintained under constant agitation.

3. The method of claim 2 wherein the polyvinyl alcohol powder has a particle size of less than 5 min.

4. The method of claim 3 wherein the monomer is selected from the group consisting of sodium vinyl sulfonate, sodium allyl sulfonate, acrylamide, methacrylamide, N-methylolacrylamide, N-methylolnetyacrylamide, 2-acrylamido-2-methylpropanesulfonic acid, and acrylonitrile.

5. The method of claim 4 wherein the base catalyst is sodium hydroxide or potassium hydroxide.

6. The method of claim 5 wherein the polyvinyl alcohol is 87 mole % to 89 mole % hydrolyzed.

7. The method of claim 5 wherein the solvent is water.

8. The method of claim 7 wherein glycerol monooleate is added to facilitate mixing.

9. The method of claim 5 wherein the monomer and the catalyst are added in stages.

10. In a method for making modified polyvinyl alcohol by saponification of polyvinyl acetate with an alcohol to yield alcohol swollen polyvinyl alcohol particles, drying the swollen polyvinyl alcohol particles, and subsequently modifying the polyvinyl alcohol, the improvement which comprises:
    (a) spraying a polyvinyl alcohol powder with an amount of a solvent containing a monomer capable of Michael-type addition such that the solvent swells the polyvinyl alcohol powder but does not form a slurry with the polyvinyl alcohol powder and does not dissolve the polyvinyl alcohol powder;
    (b) allowing the sprayed polyvinyl alcohol powder to swell;
    (c) spraying a base catalyst onto the swollen polyvinyl alcohol powder; and
    (d) raising the temperature of the swollen polyvinyl alcohol powder to initiate a Michael-type reaction between the polyvinyl alcohol and the monomer, wherein the base catalyst serves to catalyze the Michael-type reaction between the polyvinyl alcohol and the monomer.

11. The method of claim 10 wherein the swollen polyvinyl alcohol particles are maintained under constant agitation.

12. The method of claim 11 wherein the monomer is selected from the group consisting of sodium vinyl sulfonate, sodium allyl sulfonate, acrylamide, methacrylamide, N-methylolacrylamide, N-methylolmethacrylamide, 2-acrylamido-2-methyl propanesulfonic acid, and acrylonitrile.

13. The method of claim 12 wherein the base catalyst is sodium hydroxide or potassium hydroxide.

14. The method of claim 13 wherein the polyvinyl alcohol is 87 mole % to 89 mole % hydrolyzed.

15. The method of claim 14 wherein glycerol monooleate is added to facilitate mixing.

16. The method of claim 13 wherein the monomer and the catalyst are added stages.

* * * * *